United States Patent [19]

King et al.

[11] 4,291,302

[45] Sep. 22, 1981

[54] LAMP MONITORING CIRCUITS

[76] Inventors: Gordon A. King, Buckingham; George R. Nimmo, Bexhill-on-Sea; Wolfgang Bial, Borehamwood, all of England

[21] Appl. No.: 91,970

[22] Filed: Nov. 7, 1979

[30] Foreign Application Priority Data

Nov. 13, 1978 [GB] United Kingdom ............... 44221/78

[51] Int. Cl.³ ............................................ G08B 21/00
[52] U.S. Cl. ................................ 340/642; 340/52 R; 340/74; 340/660
[58] Field of Search .................... 340/52 R, 514, 590, 340/635, 638, 639, 641, 642, 660, 661, 662, 663

[56] References Cited

U.S. PATENT DOCUMENTS

| | | | |
|---|---|---|---|
| 3,252,157 | 4/1962 | Pabst | 340/642 |
| 3,408,625 | 10/1968 | Skinner | 340/79 |
| 3,421,157 | 1/1969 | Atkins | 340/642 |
| 3,593,264 | 7/1971 | Atkins | 340/52 R |
| 3,604,949 | 9/1971 | Conzelmann et al. | 340/80 |
| 3,660,813 | 5/1972 | Rumpf | 340/52 R |
| 3,774,188 | 11/1973 | Bial et al. | 340/66 |
| 4,173,750 | 11/1979 | Riba | 340/642 |

*Primary Examiner*—Alvin H. Waring
*Attorney, Agent, or Firm*—Oblon, Fisher, Spivak, McClelland & Maier

[57] ABSTRACT

A circuit for monitoring the voltage across a sensing resistor in series with a load, wherein two reference currents are generated, each dependent both on temperature and on the voltage on a power supply line, which voltage is also temperature-dependent and exhibits a temperature coefficient of such a sense and magnitude that the changes in a reference current due directly to changes in temperatures are substantially offset by the changes in that reference current due to changes in the voltage on its power supply line, which changes are in turn due to the same changes in temperature. The monitoring circuit also includes a current-repeating circuit which receives one of the reference currents, and provides an output current which is dependent both on the one received reference current, and on the potential difference developed across the series sensing resistor, such that the value of the output current at a predetermined value of the output current at a predetermined value of the potential difference across the sensing resistor is directly related to the value of the one received reference current. The monitoring circuit compares the output current of the current-repeating circuit with the other reference current, and provides an output signal indicating whether the potential difference across the sensing resistor is above or below a predetermined value.

18 Claims, 9 Drawing Figures

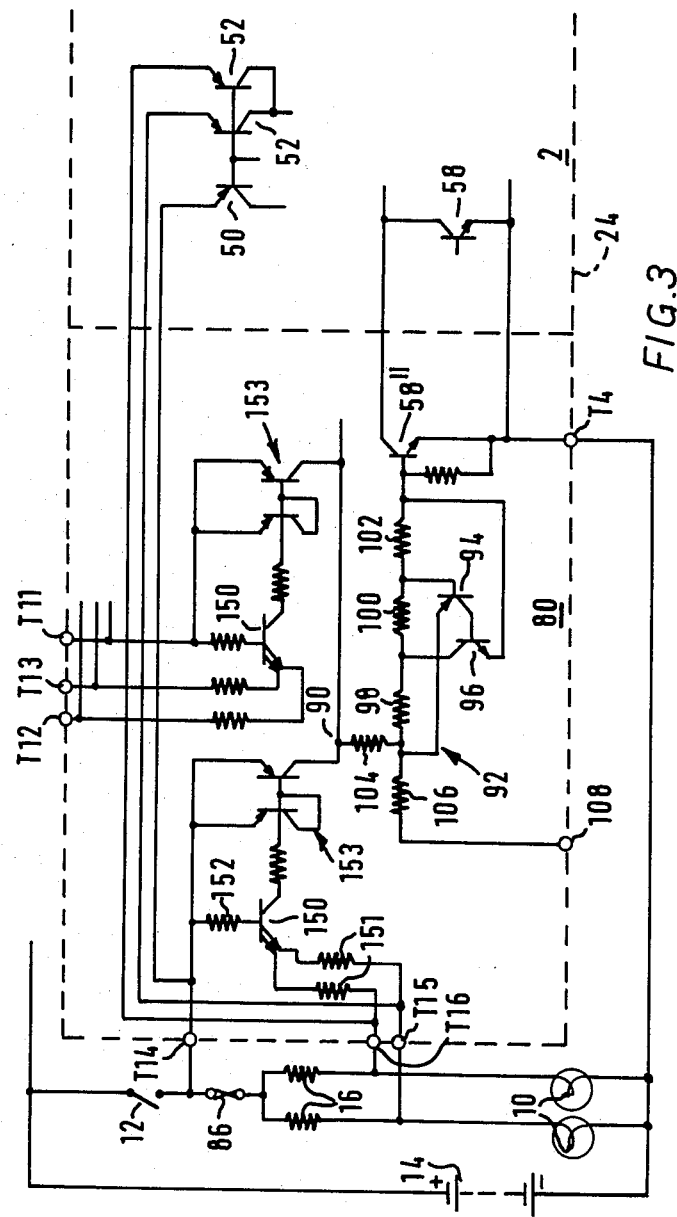

LAMP MONITORING CIRCUITS

This invention relates to electrical monitoring circuits, and more particularly but not exclusively to circuits for monitoring the operation of the lighting circuits of a motor vehicle.

It has already been proposed, for example in our British Patent No. 1,342,248, to monitor the lighting circuits of a motor vehicle, in order to detect any lamp failures which may occur, by monitoring the potential difference across a low value resistor inserted in series with each lamp. Since the nominal voltage of the electrical systems of many vehicles is only 12 volts, it is obviously desirable that the potential difference across the series resistors should be kept as small as possible, to avoid reducing excessively the voltage supplied to the lamps. There are also other factors which make it desirable to keep this potential difference as small as possible; in particular, if the potential difference is small, the resistance of the series resistor will be correspondingly small, and the circuit fuse will be better able to protect the circuit against short-circuit faults. One method which may be used for sensing such a small potential difference is to establish two reference currents, of slightly different magnitudes. The larger current is then supplied as the input current to a common base comparator, which is similar to an ordinary current mirror arrangement of two transistors, but with the base-emitter voltages of the transistors unbalanced by the amount of the potential difference, if any, across the series resistor, in such a way that the presence of such a potential difference reduces the output current produced by the comparator. This output current is then compared with the smaller of the two reference currents, as for example by connecting both currents to a summing node; if the comparison indicates that the comparator output current is greater than the smaller reference current, this means that the comparator is more or less balanced, and hence that the lamp is drawing no current, and a warning signal should be given.

The two reference currents may be established by two circuits of similar configuration, fed from a common stabilized-voltage supply line; to produce the slightly different magnitudes of current, the values of one or more of the components in the circuits are made slightly different. Various configurations of constant-current circuit may be used, but such circuits usually exhibit an appreciable temperature-dependence. This is somewhat undesirable, since, if the absolute values of the two reference currents change, without their ratio also changing, the difference between the two currents will also change, so that the threshold at which a warning signal is given will also change, and therefore the value of the series resistor has to be chosen to provide a potential drop during normal operation which is greater than the threshold value, even at the greatest value of the threshold which can occur as a result of temperature variations. It follows from this that, at most temperatures, the potential drop will be unnecessarily large.

One way of overcoming this is to take advantage of the fact that the reference currents established by the constant-current circuits may be voltage-dependent as well as temperature-dependent. Thus, according to one aspect of the invention, a circuit for monitoring the voltage across a sensing resistor in series with a load comprises means arranged to furnish two reference currents, which currents are each dependent both on temperature and on the voltage on a power supply line, the power supply line being supplied by a voltage-stabilizing circuit which is also temperature-dependent, with a temperature coefficient of such a sense and magnitude that the changes in a reference current due directly to changes in temperature are substantially offset by the changes in that reference current due to changes in the voltage on its power supply line, which changes are in turn due to the same changes in temperature, and the monitoring circuit also including current-repeating means arranged to receive one of the reference currents, and to provide an output current which is dependent both on the said one reference current, and on the potential difference across the series sensing resistor, the value of the output current at a predetermined value of the said potential difference being directly related to the value of the said one reference current, and the monitoring circuit also including means arranged to compare the output current with the other reference current, and to provide an output signal indicating whether the said potential difference is above or below the said predetermined value, in accordance with the result of the comparison.

For example, a typical form of reference current circuit might involve a resistor in series with two silicon p-n junctions. The voltage developed across the p-n junctions would exhibit a negative temperature coefficient of about 5 mV/deg.C., and so, if the circuit were supplied from a power supply which provides a truly constant voltage, the current through the resistor would exhibit a positive temperature coefficient. However, if, in accordance with this aspect of the invention, the power supply is stabilised by a circuit also having a negative temperature coefficient of voltage of the same value, the reference current will remain substantially constant despite temperature variations.

Where the load being monitored is only intermittently energised, it may be desired to arrange that a warning signal is given continuously from the time that a failure of the load to draw current is detected until some positive action is taken to cancel the warning signal. One example of such a load is given by the brake lights of a motor vehicle; another example is given by the turn indicators of a motor vehicle. It has been previously proposed to provide a monitoring circuit which latches into a warning state when a malfunction is detected, but these proposed latching circuits have been so arranged that they cannot easily be adapted to function in a non-latching manner.

According to a second aspect of the present invention, a circuit for monitoring the voltage across a sensing resistor in series with a load comprises a latch which has a single enabling/disabling terminal, and is so arranged that, by making differing connections, or no connection at all, to the enabling/disabling terminal, the latch either will exhibit first and second stable states, corresponding respectively to voltages greater and less than a threshold value across the series sensing resistor, or will exhibit only the first stable state, and the latch also being connected to receive signals from a voltage-monitoring part of the circuit, which signals tend to switch the latch from its first stable state to its second stable state if the monitored voltage should fall below the threshold value, and the circuit also including warning means arranged to provide a warning signal if either the latch adopts its second stable state, or, when the latch is disabled to have only the first stable state, the signals from the voltage-monitoring part of the circuit indicate that the monitored voltage has fallen below the threshold value.

The output of the latch is preferably permanently connected to a control input of the warning means, whether or not the latch is enabled. In this case, there is more than one way of arranging for the warning signal to be given when the latch is disabled to have only the first stable state. In the preferred embodiment, the latch remains firmly in its first state when disabled, whatever the value of the monitored voltage, and a bypass signal path is provided from the voltage-monitoring part of the circuit to a control input of the warning means. Thus, when disabled, the latch can have no effect on the warning means, which is influenced only by the signals in the bypass path. Alternatively, however, the latch could be so arranged that, when disabled, it can still adopt its second state if the monitored voltage should fall below the threshold value, but that this second state is no longer a stable state. In this case, the latch would revert to its first state, and the warning signal would cease, as soon as the monitored voltage rises above the threshold value again, and there is no need for a bypass signal path.

It may be desirable to use a single sensing resistor in series with a parallel group of two or more loads, each of which can fail separately. This reduces the number of resistors required, and also reduces the number of connections which have to be made to the monitoring circuits. However, it also means that, instead of there being only two possible conditions (failure or no failure) which can occur in the load fed by a single sensing resistor, there are, in the case of a parallel group of two loads, three possible conditions (no failure, one failed load and two failed loads). A warning signal must be given in either of the latter two conditions, and since there is still a potential drop across the series resistor in the case where only one load has failed, it follows that the monitoring circuit must give a warning signal when the potential difference across the resistor has fallen below a reference value which always lies between the potential drop to be expected when both loads are working and the potential drop to be expected when only one load is working. If the resistance of the loads remains constant then, even if the supply voltage should vary, the expected values of potential drop will be directly proportional to the supply voltage, and the reference value could easily be derived from a straightforward resistive potential divider. However, where the loads are formed by tungsten filament lamps, which have an appreciable positive temperature coefficient of resistance, the resistance of the lamps, when operating, will increase considerably with an increase in the supply voltage. Where the lamps are part of the lighting circuits of a motor vehicle, considerable variations in supply voltage are to be expected; a nominally 12 volt system may show variations between 8 and 16 volts. The resulting variation in the resistance of the lamps means that the expected values of potential drop will not be directly proportional to the supply voltage. If the reference value is still derived from a resistive potential divider, there may be difficulties in ensuring that the reference value always remains between the two expected values of potential difference which have to be distinguished, especially if the parallel group contains more than two lamps. The position is aggravated by the tolerances allowed in the manufacture of the lamps.

According to a third aspect of the present invention, a circuit for monitoring the voltage across a sensing resistor in series with an incandescent lamp load comprises a source of a reference voltage, which is supplied from the same supply as the load, and furnishes a reference voltage whose variation with changes in supply voltage is similar to the variation in the monitored voltage with changes in supply voltage, and the circuit also includes means arranged to compare the monitored voltage with the reference voltage, and to provide a warning signal if the monitored voltage should become less than the reference voltage.

This may make it possible to monitor a parallel group of more than one lamp, and to discriminate between the case in which all the lamps are working, and the case in which only one lamp has failed. Although it might be possible to achieve this, even if the reference voltage were furnished by a resistive potential divider, the use of a reference voltage which is not directly proportional to supply voltage should allow the use of a series resistor of a lower value, for reasons which will be explained below. This may be advantageous in reducing the power dissipation in the sensing resistor, and also in making the greatest possible fraction of the supply voltage available for the lamps.

The reference voltage may comprise the sum of a first, constant component and a second component which is proportional to supply voltage. This would give a straight-line relationship between reference voltage and supply voltage; obviously, the relative magnitudes of the two components would be so adjusted that the straight line approximates, over the normal range of supply voltage, to the ideal curve, which would be similar in shape to the curve of variation of the voltage across the sensing resistor with changes in supply voltage. The ideal curve can, in many cases, be approximated over the normal range of supply voltage by a proportionality of the form $$V_1 \alpha V_B^\alpha$$

where $V_1$ is the reference voltage, $V_B$ is the supply voltage, and the exponent $\alpha$ is less than 1. In many cases, it is found that the value of $\alpha$ is very close to 0.5. The straight line which approximates to this curve is given by $$V_1 \alpha (1-\alpha)V_{1NOM} + \alpha \cdot \frac{V_{1NOM}}{V_{BNOM}} \cdot V_b$$

where $V_{BNOM}$ is the normal supply voltage, and $V_{1NOM}$ is the reference voltage needed at the nominal supply voltage. Thus if the value of $\alpha$ is 0.5, the reference voltage at the nominal supply voltage is comprised half by the first term of the above proportionality, which is constant, and half by the second term, which is directly proportional to supply voltage.

The monitoring circuits described above are designed to provide a warning signal if the load should become open-circuit, but it may also be desirable that a warning should be given if such items as fuses, or even the series sensing resistor itself, should become open-circuit. Under these conditions, the full supply voltage will appear across the open-circuit element, whereas there should be only a very small potential difference. Thus, according to a fourth aspect of the invention, a circuit for monitoring the voltage across a sensing resistor in series with a load comprises first means responsive to the voltage across the sensing resistor and arranged to provide a warning signal if the voltage should fall below a predetermined small value, and second means responsive to the voltage across the sensing resistor, or other component in series with the load, and arranged to provide a warning signal if the latter voltage should rise above a predetermined value, greater than the said predetermined small value.

In a convenient arrangement, the voltage above which the voltage across the series resistor, or other component, must rise in order to generate a warning signal is set by the forward voltage drop of one or more p-n junctions. More particularly, the base-emitter junction of a transistor may be connected across the series resistor; with such an arrangement, the transistor would turn on as soon as the voltage across the resistor exceeded about 0.7 volts, for a silicon transistor. Where several loads, each with its own sensing resistor, are fed from a common point, all the resistors may be monitored using a single multiple-emitter transistor; the base of the transistor could be connected to the common point, while each emitter of the transistor would then be connected to the other end of a respective one of the resistors. Alternatively, a single-emitter transistor could be used, with a separate diode connected between its input electrode and each of the said other ends of the resistors; in effect, the diodes would form an OR-gate. With such an arrangement, the voltage across the sensing resistor would have to reach about 1.4 volts before the transistor would turn on to give a warning signal, but since a typical application of the invention is to a vehicle electrical system, where at least 10 volts will normally be available to turn on the transistor if the sensing resistor should fail, there will be no difficulty in ensuring that the transistor turns on when necessary.

If the fuse protecting the circuit is inserted between the common feed point for the resistors, and the resistors themselves, then the fuse will automatically be monitored along with the resistors. Alternatively, where more than one fuse is used, the several fuses will normally be fed from a common point, and therefore a single transistor could be used to monitor all the fuses, in the same way as with a group of resistors fed from a common point.

The monitoring circuit may be so arranged that only one warning device is used, and is activated in response to any of the types of failure which can be detected by the monitoring circuit. The warning device may be activated in different modes to indicate different types of failure; for example, steady illumination of a warning lamp could indicate a load failure, while a flashing lamp could indicate sensing resistor or fuse failure. Alternatively, separate warning devices could be provided to indicate the different types of failure. As will be described below, it is possible to devise a single basic circuit which will provide a variety of options for the warning arrangements, the required option being selected simply by making a few extra connections to the basic circuit.

The invention may be carried into practice in various ways, but several specific embodiments will now be described by way of example, with reference to the accompanying drawings, of which:

FIGS. 3 to 8 are circuit diagrams, similar to part of FIG. 2 but showing modified arrangements.

Figure 1:
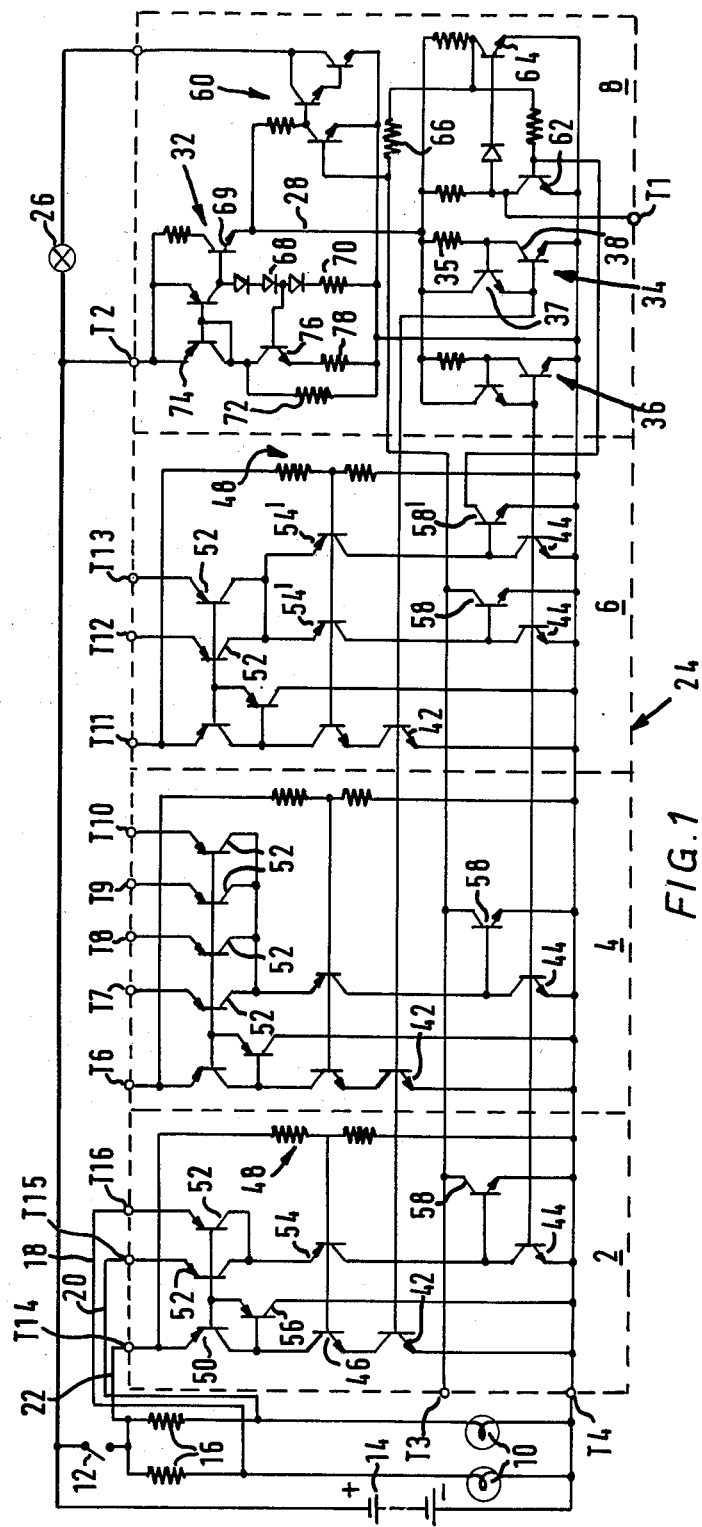
FIG. 1 is a circuit diagram of an arrangement for monitoring the lamps of the lighting circuits of a motor vehicle.

The circuit of FIG. 1 is arranged to monitor the operation of the lamps of a motor vehicle. Two of these lamps are shown at 10, while a single switch controlling both these lamps is shown at 12, and the battery of the vehicle is shown at 14. These items are all entirely conventional. The circuit also includes, in series between each lamp 10 and its controlling switch 12, a low value resistor 16, whose function is to generate a small potential difference between its ends when the associated lamp 10 draws current. Connections 18, 20 and 22 extend from the junctions between the resistors 16 and the lamps 10 and between the resistors 16 and the switch 12 to three terminals T14, T15 nd T16 of an integrated circuit 24, whose limits are shown in broken line. The function of the integrated circuit 24 is to detect the presence or absence of the small potential differences across the resistors 16, and to provide a warning signal if one or both of these potential differences should be absent at a time when the switch 12 is closed. In the circuit of FIG. 1, the warning signal takes the form of a warning lamp 26.

The arrangement and operation of the integrated circuit 24 will now be described in greater detail.

Since the lighting circuits of a motor vehicle will normally include more than one lighting control switch, each controlling a group of lamps, the integrated circuit 24 is arranged to be able to monitor three such groups of lamps. More particularly, the integrated circuit 24 includes three similar, although not identical, sections 2, 4 and 6, each of which is concerned with monitoring a single group of lamps. For simplicity, only one group of lamps 10, connected to the terminals T14, T15 and T16 of the circuit section 2, are shown in FIG. 1; it should be clear that a second group (of up to four lamps, each with its own series resistor) can be connected in similar manner to the terminals T6 to T10 of the circuit section 4, and a third group of two lamps can be connected to the terminals T11, T12 and T13 of the circuit section 6. The integrated circuit 24 also includes a fourth, common, section 8, which cooperates with all three sections 2, 4 and 6, and controls the warning lamp 26.

The integrated circuit 24 is supplied with power from the battery 14 through its terminals T2 (positive) and T4 (negative). A power supply rail 28 is regulated at about 2 volts with respect to the negative terminal by a voltage regulator arrangement 32. This regulated voltage feeds, among other things, two reference current circuits 34 and 36.

The two reference current circuits 34 and 36 are similar in their arrangement, although not quite identical. Taking the circuit 34 as an example, it includes a resistor 35 which leads from the power supply rail 28 to the collector of an NPN transistor 38, whose emitter is connected to the negative terminal T4. Almost the whole of the current through this resistor flows into the collector of the transistor 38, and forms the reference current established by the circuit 34, but a very small fraction is diverted to form the base current of a further NPN transistor 37, whose emitter current provides the base current for the transistor 38, and also provides the base current for three further NPN transistors 42, one in each of the circuit sections 2,4 and 6, whose base-emitter junctions are connected in parallel with the base-emitter junction of the transistor 38. Since the transistors 38 and 42 are formed on the same integrated circuit, they will be fairly closely matched, and, so long as the transistors 42 are kept out of saturation, they will each mirror the reference current in the transistor 38.

In a similar manner, the reference current circuit 36 establishes a reference current which is mirrored in four transistors 44, so long as the transistors 44 are kept out of saturation. Two of the transistors 44 are included in the circuit section 6, while the remaining two transistors 44 are included one in each of the circuit sections 2 and 4.

The voltage at the lower end of the resistor 35, relative to the negative terminal T4, is formed by the sum of the base-emitter voltages of the transistors 37 and 38, and it will therefore have a negative temperature coefficient of about 5 mV/deg.C. In order that the reference current established by the circuit 34 should remain constant, despite variations in temperature, it is therefore desirable that the voltage regulator arrangement 32 should exhibit a similar negative temperature coefficient, and this is achieved in the following manner.

The output of the regulator is provided by a transistor 69, coupled as an emitter follower. The voltage applied to the base of the transistor 69 is provided across a chain of three diodes 68 and a resistor 70 in series. A constant current is supplied to this chain, and therefore the base voltage of the transistor 69 will be constant as long as the temperature of the components is constant, being made up of the ohmic voltage drop across the resistor 70 and the forward voltage drops across the diodes 68.

The output voltage of the regulator therefore exhibits a negative temperature coefficient which corresponds to the difference between the temperature coefficient resulting from the presence of the three diodes 68 and that exhibited by the base-emitter junction of the transistor 69; this resultant temperature coefficient is of substantially the same value as that shown by the voltage at the lower end of the resistor 35.

The constant current supplied to the diodes 68 is provided by a current mirror 74 comprising two PNP transistors connected to the positive terminal T2. The input current to the current mirror 74 is established by an NPN transistor 76, whose base is connected to the anode of the bottom diode in the chain of diodes 68. The base-emitter voltage of the transistor 76 will be substantially equal to the forward voltage drop across the bottom diode 68, so that the emitter voltage of the transistor 76 is held constant at the same value as the voltage across the resistor 70. The emitter of the transistor 76 is connected through an ohmic resistor 78 to the negative terminal 74, and therefore the collector and emitter currents of the transistor 76 are also maintained constant, to provide a constant input current for the current mirror 74.

A high value resistor 72 is connected in parallel with the collector-emitter path of the transistor 76, in order to ensure that the regulator arrangement 32 will turn on; without this resistor, it would in principle be possible for all the transistors to remain off.

It will be appreciated that any other voltage regulator arrangement which provides the required negative temperature coefficient could be used.

Taking the transistor 42 in the circuit section 2 as an example, this transistor is kept out of saturation as long as the switch 12 is closed. Under these conditions, the collector current of the transistor is repeated by a transistor 46 connected in common-base configuration, with its base voltage established by a potential divider 48 fed from terminal T14, which is in turn fed from the battery 14 through the switch 12. Almost the whole of the collector current of the transistor 46 is drawn from the terminal T14 through a PNP transistor 50. If one or both of the terminals T15 and T16 is at exactly the same potential as the terminal T14, this current is mirrored in one or both of two further PNP transistors 52, since the bases of the transistors 50 and 52 are connected together and their emitters are connected one to each of the terminals T14, T15 and T16; under these conditions, the circuit is working in virtually the same way as any current mirror. These conditions will only occur if one or both of the lamps 10 fails to draw current. If instead the lamps are functioning correctly, the resulting voltage drops across the resistors 16 will reduce the base-emitter voltages applied to both the associated transistors 52, so that both the transistors 52 pass a very much lower current. The collector currents of the two transistors 52 are combined, and repeated by a further transistor 54 in common-base configuration, whose base voltage is established by the potential divider 48.

Thus, if the switch 12 is closed, and both the lamps 10 draw current, only a small current flows in the collector lead of the transistor 54. If the switch 12 is open, no collector current at all can flow in the transistor 54. Neither of these conditions results in a warning signal being given. However, if the switch 12 is closed, but one of the lamps 10 fails to draw current, the collector current in the transistor 54 becomes substantially equal to the reference current set by the circuit 34. This fact results in a warning signal being given. Of course, if both lamps 10 should fail to draw current, an even larger collector current will flow in the transistor 54, and this will also result in a warning signal being given.

The base currents for the PNP transistors 50 and 52 are supplied by a further PNP transistor 56, whose base current is provided by a small fraction of the collector current of the transistors 46. This arrangement has certain advantages over a simple current mirror circuit, in which the base currents would be supplied directly from the collector of the transistor 46. In particular, since the majority of the transistors on the integrated circuit 24 are NPN, the manufacturing process will be adjusted to produce NPN transistors with a high gain, and the gain of the PNP transistors will probably be rather low. This means that quite large base currents are required for the transistors 50 and 52, and if these were drawn directly from the collector of the transistor 46, the collector current in the transistor 50 would vary appreciably according to what current was at any moment required to drive the transistors 52. In the case of the transistors 50 and 52 in the circuit section 4 it will be appreciated that this problem is more acute, since in this case, base currents for five transistors rather than three have to be supplied. The use of extra transistor 56 ensures that the collector current in the transistor 50 remains reasonably constant.

The collector current of the common-base transistor 54 in the circuit section 2 is supplied to the collector of the transistor 44 in that circuit section. If the switch 12 is closed and one of the lamps 10 fails to draw current, then, as described above, the collector current of the transistor 54 will be substantially equal to the reference current set by the circuit 34. The reference current set by the circuit 36 is about five-sixths of that set by the circuit 34, and therefore under these conditions the transistor 44 will remain unsaturated, passing about five-sixths of the current from the transistor 54. The remainder of the current from the transistor 54 forms the base drive for a transistor 58; when the transistor 58 is turned on, the warning lamp 26 is energised by means of a direct-coupled three-transistor amplifier 60 forming part of the common circuit section 8.

Conversely, if either the switch 12 is open, or the lamps 10 are both drawing current, the transistor 54 will pass only a small current, insufficient to keep the associated transistor 44 out of saturation, and the transistor 58 will remain cut-off, so that no warning is given.

The circuit section 4 is essentially a duplication of the circuit section 2, apart from the use of four transistors 52; the duplicated components include the transistors 46, 50, 52, 54, 56 and 58; the collector-emitter paths of the transistors 58 are connected in parallel, so that a base drive to either of the transistors 58 will result in a warning signal being given.

The circuit section 6 is somewhat different from the sections 2 and 4. The section 6 is intended to be used for monitoring lights of the vehicle which are required to operate only intermittently, such as, in particular, the brake lights. Whereas the circuit sections 2 and 4 are so arranged that the warning lamp signal will persist only for as long as the switch supplying the lamp which has failed to light is closed, the circuit section 6 is so arranged that, if the brake light switch closes, but one of the brake lights fails to draw current, an internal latch in the integrated circuit will be set, and will remain set, even when the brake light switch opens again, until the supply from the battery 14 is interrupted. As long as the latch is in the 'set' state, the warning lamp is energised.

As indicated above, the circuit section 6 includes one of the transistors 42 and two of the transistors 44; it also includes transistors 46, 50, 52 and 56 which are arranged in exactly the same way as the corresponding transistors in the circuit section 2, except that the area of the base-emitter junction of each of the transistors 52 is twice that of the transistor 50. This means that, if the same voltage is applied to the base-emitter junctions of the transistor 50 and one of the transistors 52, indicating that one of the lamps being monitored is not drawing current, the collector current in the transistor 52 will be twice that of the transistor 50. The combined collector currents of the two transistors 52 are now shared equally between two transistors 54', so that, when a lamp failure has occurred, each of the transistors 54' will receive a current substantially equal to the reference current supplied to the transistor 50. The transistors 54' are connected in common-base configuration; as with the transistors 54, the base voltage of the transistors 54' is established by a potential divider 48. The collector current of one of the transistors 54' is supplied to one of the transistors 44, and to the base of a third transistor 58, which is connected in exactly the same manner as the other two transistors 58. The collector current of the other transistor 54' is supplied to the collector of the remaining transistor 44, and the collector of this transistor 44 is connected to the base of a further transistor 58'; thus, the transistor 58' will be turned on in exactly the same manner as the transistor 58 when a brake light fault is detected.

Instead of making the base-emitter junction areas of the transistors 52 larger than that of the transistor 50, various other methods may be used to ensure that the comparator operates correctly despite the sharing of the comparator output current between the two transistors 54'. In particular, the base-emitter junction areas of any of the transistors 42, 50 and 44 in the circuit section 6 can be different from those in the circuit section 2.

The collector of the transistor 58' is connected to the base of a transistor 62 which, with a further transistor 64, forms the latch mentioned above. In the normal state, the transistor 62 is on and the transistor 64 is off. The collector of the transistor 64 is connected, through a resistor 66, to the collectors of the transistors 58. Thus, in the normal state of the latch, the amplifier 60 is unaffected by the presence of the transistor 64, but if the transistor 58' should turn on, indicating that a brake light fault has been detected, the latch will go to its 'set' state, with the transistor 62 turned off and the transistor 64 turned on; the turning-on of the transistor 64 has the same effect as turning-on of any of the transistors 58, that is to say, the warning lamp 26 is illuminated.

The value of the resistor 66 is such that turning-on of the transistors 58 cannot set the latch.

The collector of the transistor 62 is connected to a terminal T1 of the integrated circuit 24. This allows the same design of integrated circuit to be used both in circuits which require the latching behaviour described above, and in circuits which require the warning signal to persist for only as long as the switch 12 supplying the faulty lamp is closed. In the former case, no external connection is made to the terminal T1, and the circuit functions exactly as described above. (In practice, a capacitor could be connected to the terminal T1 to help to ensure that the latch cannot be set by external electrical noise). In the latter case, the terminal T1 is connected to the negative terminal T4; this has the effect of holding the transistor 64 permanently off, so that the latch can never affect the amplifier 60 which drives the warning lamp 26. In this case, the transistor 58 which is controlled by the circuit section 6 comes into play to provide the necessary warning signal if one of the lamps monitored by this section should fail.

The circuit shown in FIG. 1 has the disadvantage that, although it can detect failure of a lamp 10 to light owing to a faulty lamp, or a break in the lamp circuit between the lamp 10 and the point at which the emitter lead of the transistor 52 is connected to the main lamp circuit, it cannot detect faults such as an open-circuit resistor 16, or a blown fuse. To overcome this disadvantage, the circuit of FIG. 2 can be used. This circuit is a development of the integrated circuit of FIG. 1, and, for simplicity, only the parts corresponding to the circuit section 2 of FIG. 1 are shown. These parts are collectively designated as circuit section 2', and parts corresponding exactly to parts of FIG. 1 will be designated by the same reference numerals.

Figure 2:
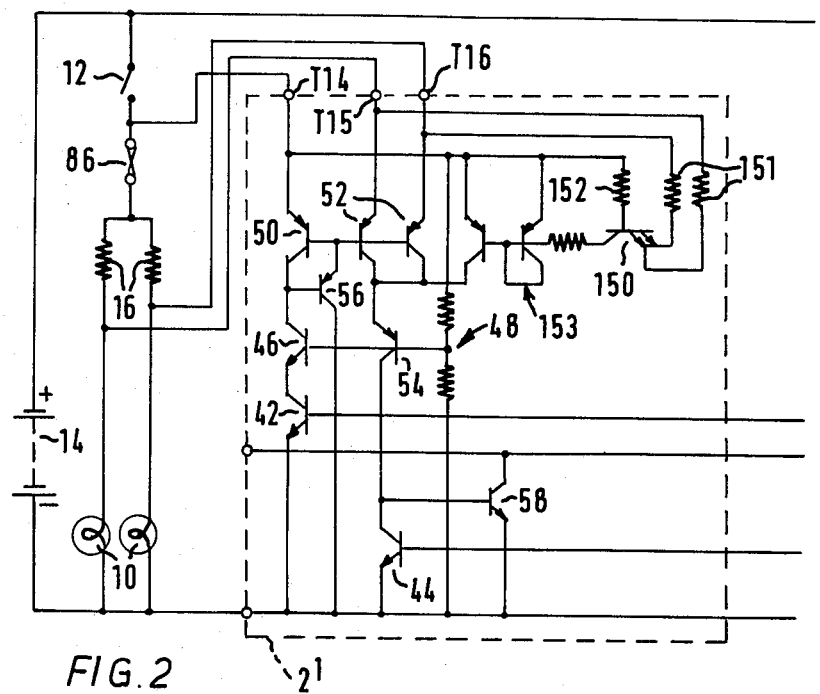
FIG. 2 is a circuit diagram, similar to that of FIG. 1, and showing an arrangement for monitoring fuses and other components in series with the lamps.

The circuit design 2' includes a multiple-emitter transistor 150, having as many emitters as there are lamps 10 to be monitored; thus, in the circit section 2', the transistor 150 has two emitters. Each of these emitters is connected, through a protective resistor 151, to one of the terminals T15, T16, which are connected to the junctions between the lamps 10 and the series resistors 16. The base of the transistor 150 is connected to the terminal T14 through a limiting resistor 152; thus, as long as the voltage drops across the two resistors 16 are either zero, as occurs when the associated lamp 10 is not drawing curent, or fairly small, as occurs when the lamps 10 are drawing current, and there is no fault in the circuit, the transistor 150 will remain off. However, if one (or more) of the resistors 16 should become high-resistance or open-circuit, a much larger voltage will appear between its ends when the switch 12 is closed, and this voltage will turn on the transistor 150. FIG. 2 also shows a fuse 86, protecting the circuit supplying the two lamps 10. This fuse is inserted between the switch 12 and the series resistors 16, and the connection to the terminal T14 is taken from a point between the switch 12 and the fuse 86. Thus, if the fuse should blow, the transistor 150 will turn on, in exactly the same way as if the two resistors 16 had become open-circuit.

The transistor 150 will not turn on until the voltage across the resistors 16 and the fuse 86 reaches about 0.7 volts; this helps to ensure that, even if the fuse 86 is mounted in a fuse holder which provides a comparatively poor connection, for example because the fuse holder contacts a corroded, a false alarm will not be produced by the resulting voltage drop across the fuse.

The collector of the transistor 150 is connected to a current mirror 153, and the output current of the current mirror 153 is connected, in parallel with the collector current from the transistors 52, to the transistor 54. Thus, if the transistor 150 should turn on in the manner described above, the transistor 58 will be turned on, and the warning lamp 26 will be lit.

Obviously, similar arrangements will be provided in each of the circuit sections 4' and 6', and will act to turn on the respective transistors 58 or 58' when a fault occurs.

FIG. 3 shows an alternative circuit for carrying out the same monitoring function as the circuit of FIG. 2. This circuit is illustrated as a separate circuit section 80 of the integrated circuit 24. The circuit section 80 contains, for each of the circuit sections 2, 4 and 6, a multiple-emitter transistor 150, protective resistors 151 and 152, and a current mirror 153. (For simplicity, the components for the circuit section 4 are not shown in FIG. 3.) These components are connected in much the same way as the corresponding components in FIG. 2. However, instead of the output current of the current mirror 153 being fed to the respective transistor 54, the outputs of the three current mirrors 153 are connected in parallel to a common point 90, which is connected through a network 92 of transistors and resistors to the base of a transistor 58''. The collector-emitter path of this transistor is connected in parallel with the collector-emitter paths of the transistors 58 and 58' of the integrated circuit 24. Thus, when one of the transistors 150 turns on, the voltage at the common point 90 will rise nearly to the positive battery voltage, whereas previously it was a much lower voltage, and this turns on the transistor 58'', illuminating the warning lamp 26. In the circuit of FIG. 3, the network 92 performs no function that could not be performed by a resistor, but in other circuits which will be described later, the network 92 performs certain other functions.

The network 92 includes two transistors 94 and 96 and three resistors 98, 100 and 102 which together form a two-terminal negative resistance network. The component values are so selected that, if the current through the network rises slowly from zero, the transistors 94 and 96 remain off until the current reaches about 1 mA. At this point, the voltage drop across the negative resistance network is about 6 volts, and the voltage drop across the resistors 98 and 100 becomes sufficient to turn on the transistors 94 and 96. This diverts part of the current away from the resistors 100 and 102, to keep the base-emitter voltage of the transistor 94 steady at about 0.7 volt, and this diversion of current results in a decrease in the voltage across the negative resistance network with increasing current (above 1 mA). The network 92 also includes an ohmic resistor 104 between the common point 90 and the negative resistance network; the value of the resistor 104 is sufficient to ensure that the resistance of the network 92 as a whole is always positive. In the circuit of FIG. 3, effectively no connection is made to the junction between the resistor 104 and the negative resistance network; although a resistor 106 formed in the circuit section 80 extends from this junction to a terminal 108 of the integrated circuit, in the circuit of FIG. 3 this pin is left open-circuit. Thus, as mentioned above, in FIG. 3 the network 92 behaves similarly to an ohmic resistor, but by making external connections to the terminal 108, the circuit can be made to behave in other ways, which will now be described.

Figure 4:
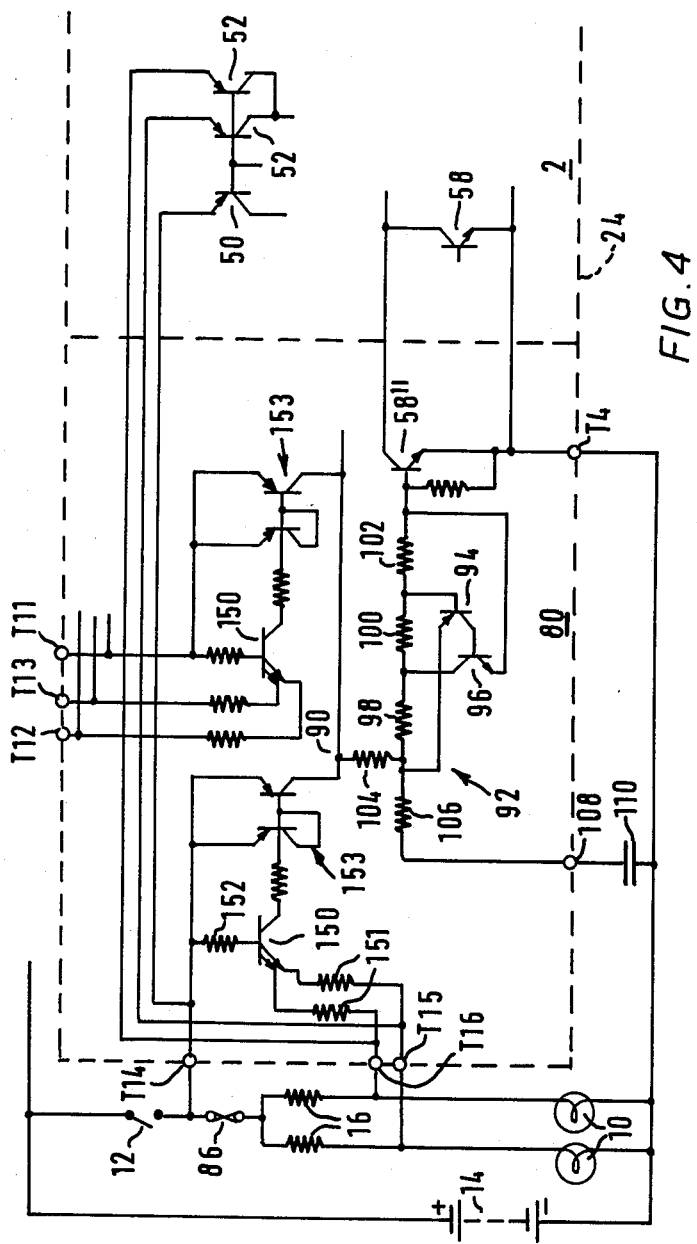

FIG. 4 shows a large value capacitor 110 connected between the terminal 108 and the battery negative terminal. With this arrangement, if a fuse 86 or a resistor 16 should fail, the common point 90 will go positive, as before. The capacitor 10 will therefore begin to charge through the resistors 104 and 106; the values of these resistors are so chosen that, as the charging process begins, the negative resistance network will not pass sufficient current to turn on the transistor 58''. When the voltage across the negative resistance network reaches about 6 volts, it will suddenly switch to a heavily conducting state, turning on the transistor 58'' to illuminate the warning lamp 26, and discharging the capacitor 110. When the capacitor has discharged to a rather lower voltage, the cycle repeats. In other words, the circuit acts as a relaxation oscillator. Thus, it will be seen that, with the circuit of FIG. 4, flashing of the lamp 26 indicates a resistor or fuse failure, while steady illumination of the lamp 26 indicates a lamp bulb failure.

If it is desired for any reason to disable the monitoring of the resistors 16 and fuse 86, the terminal 108 can be short-circuited to the battery negative terminal; this is not separately illustrated. This ensures that the negative resistance network can never become sufficiently conductive to turn on the transistor 58''.

Figure 5:
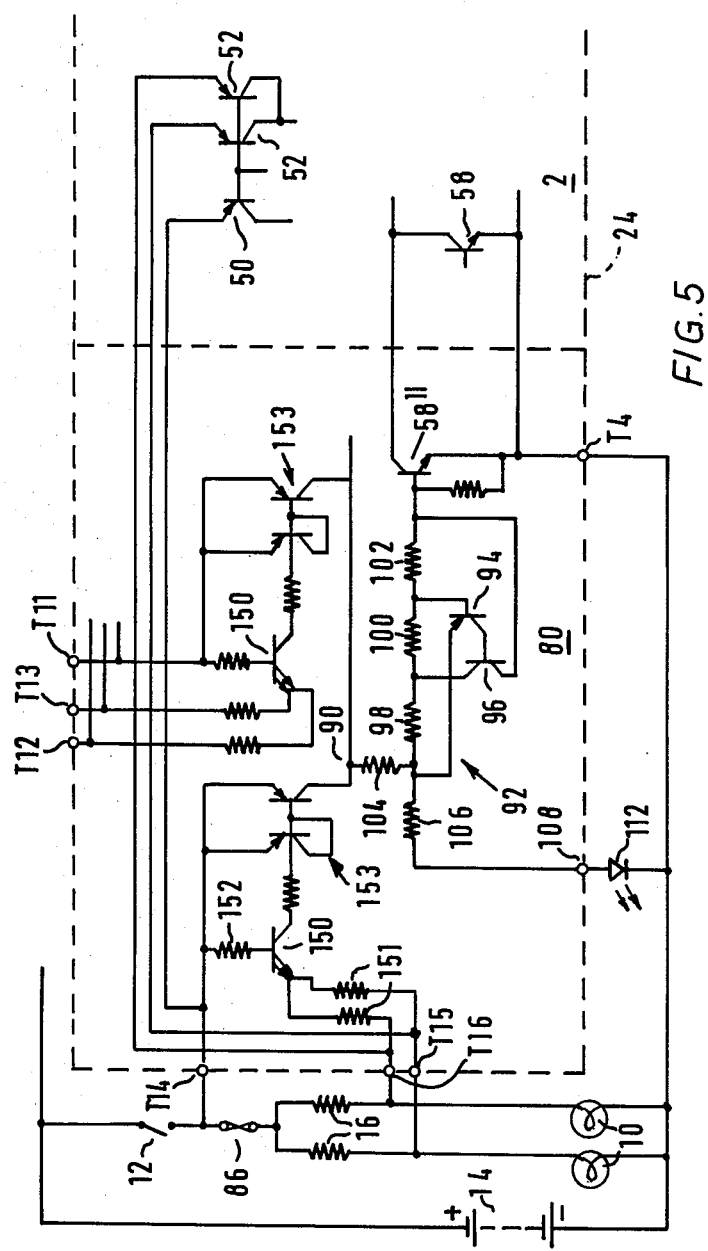

FIG. 5 shows how a light-emitting diode 112 can be connected between the terminal 108 and the battery negative terminal. This has the same effect as a short-circuit in preventing the transistor 58'' from turning on, but the diode 112 itself now provides a warning of resistor or fuse failure.

Figure 6:
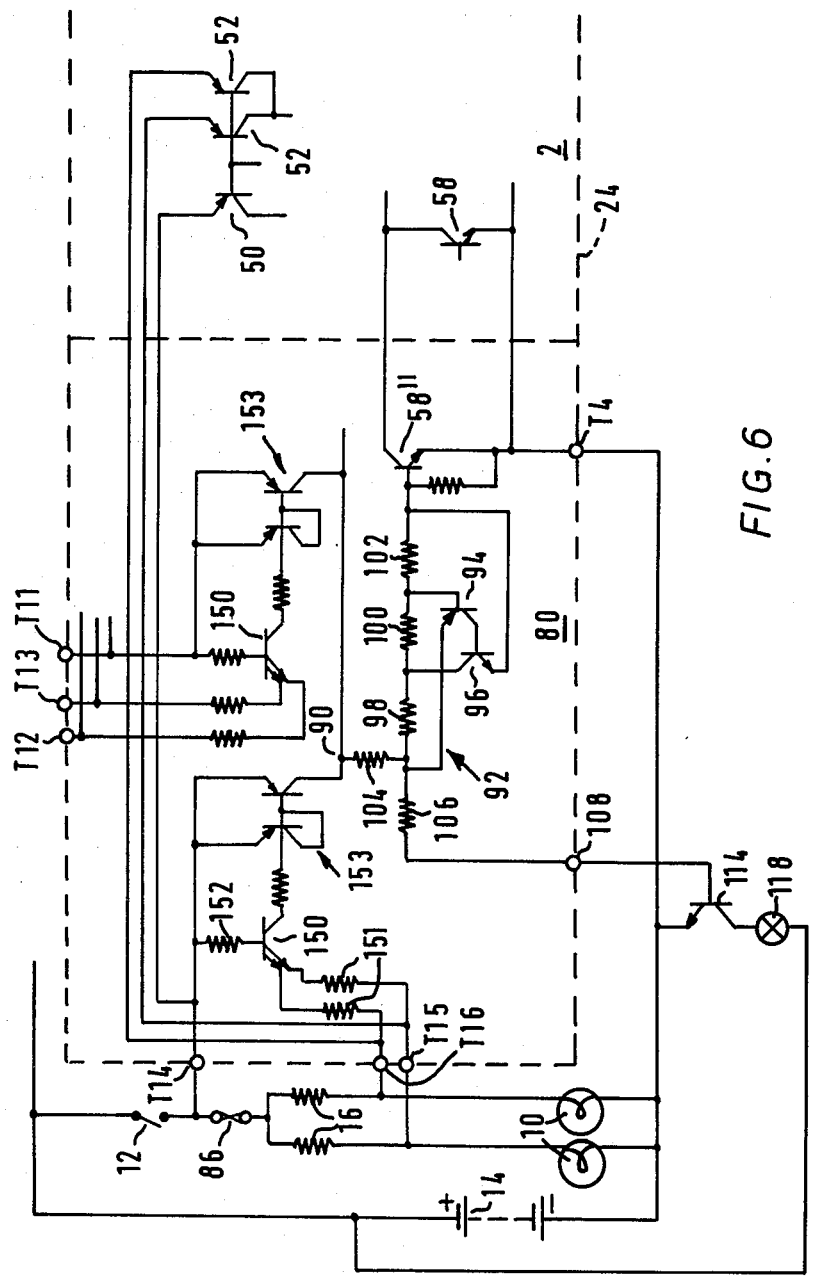

FIG. 6 shows how, if it is desired to use a more powerful warning lamp than the light-emitting diode 112, a transistor 114 can be used as a lamp driver, driving an incandescent lamp 118. In this case, the base-emitter junction of the transistor 114 replaces the diode 122, so that the warning lamp 26 is still not illuminated by a resistor or fuse failure.

Figure 7:
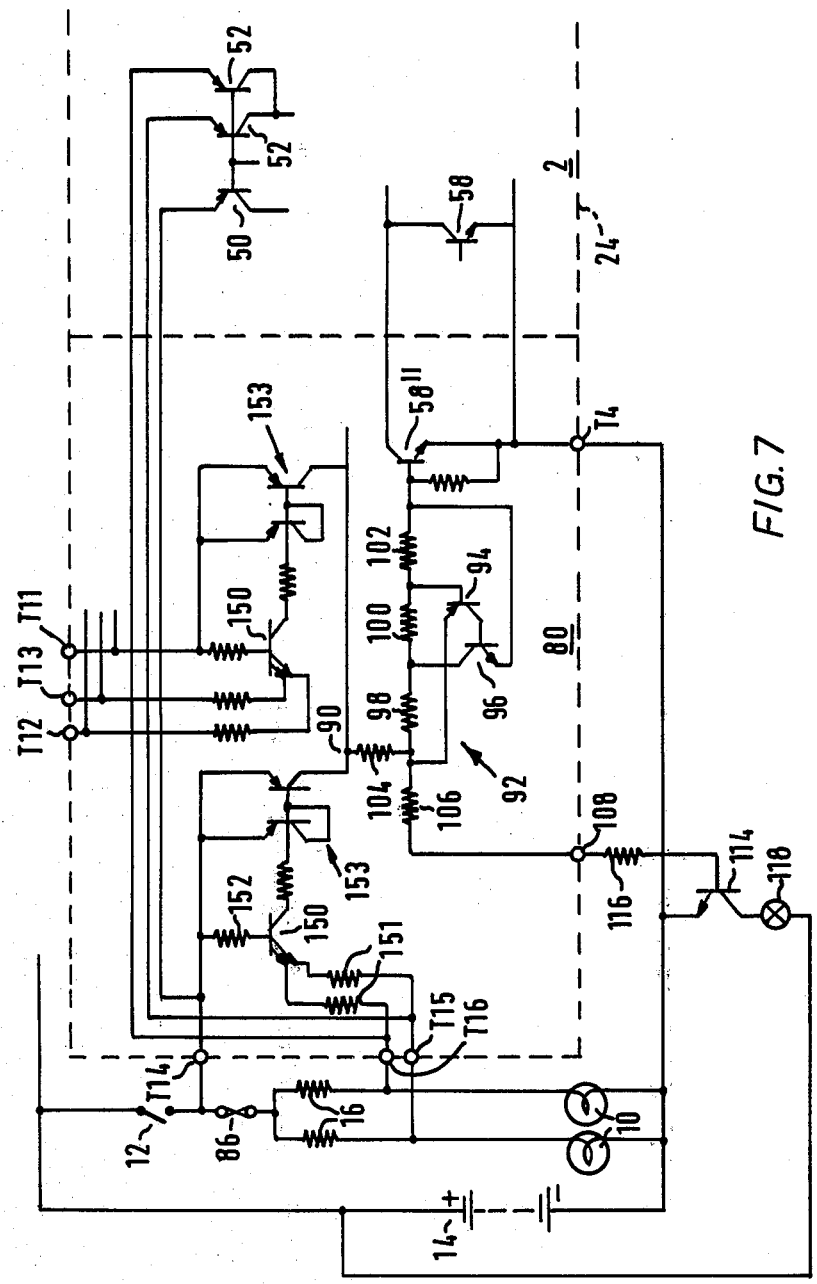

Finally, FIG. 7 is similar to FIG. 6, but shows a resistor 116 inserted in series with the base of the transistor 114. With this arrangement, the current through the negative resistance network will be sufficient, when a resistor or fuse failure occurs, to turn on the transistor 58'' and light the lamp 26, while at the same time the transistor 114 turns on to illuminate the lamp 118.

Although the integrated circuit 24 described above achieves these various functions using only a single group of components (the network 92 and the transistor 58'') within the integrated circuit, it will be appreciated that there might be advantages in providing separate groups of components within the integrated circuit to provide different modes of operation. For example, a thermal oscillator might be provided within the integrated circuit 24 to perform the function of the relaxation oscillator of FIG. 4; this would allow the large value capacitor 110 to be dispensed with.

Figure 8:
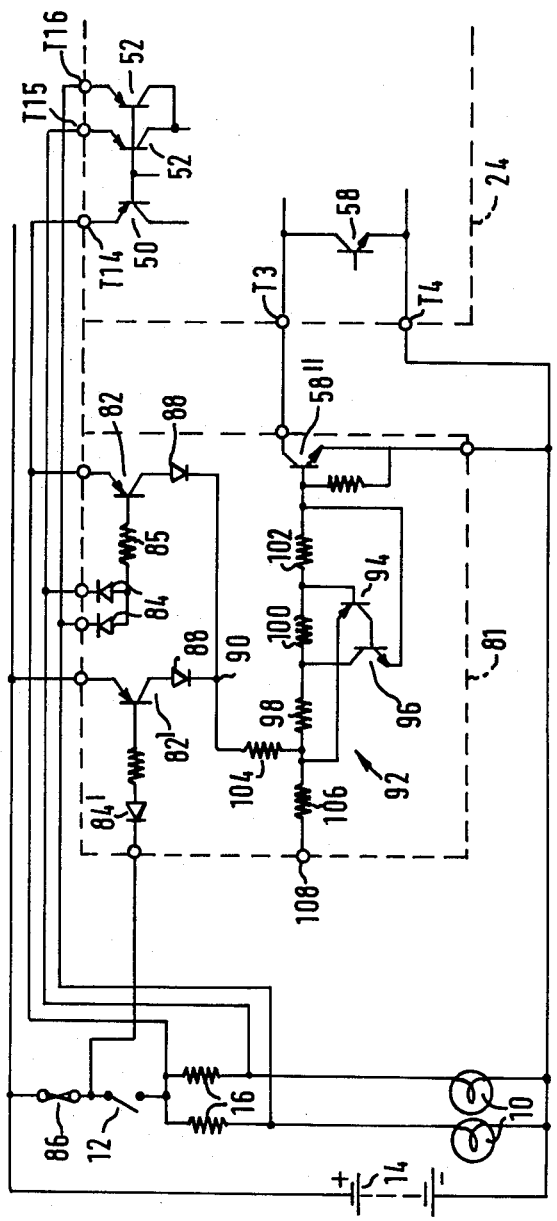

FIG. 8 shows a circuit which is similar to that of FIG. 3, but does not use multiple-emitter transistors to monitor the voltages across the resistors 16 and the fuse 86. Also, the circuit shown in FIG. 8 is arranged to monitor the voltage across the fuse 86 separately from the voltage across the resistors 16.

In FIG. 8, the components which are concerned with monitoring the resistors 16 and the fuses 86 are formed in a separate integrated circuit 81, which forms an adjunct to the integrated circuit 24; to allow the integrated circuit 81 to control the lamp 26 through the amplifier 60, the terminal T3 of the integrated circuit 24 provides an external connection to the input of the amplifier 60, and the integrated circuit 81 is connected to this terminal.

The integrated circuit 81 includes, for each group of lamps to be monitored, a PNP transistor 82. From the junction of each lamp 10 with its associated resistor 16, a diode 84 leads to a resistor 85, which is connected in turn to the base of the transistor 82, while the emitter of the transistor is connected to the junction of the resistors 16 and the switch 12. Thus, as long as the voltage drops across the two resistors 16 are either zero, as occurs when the associated lamp 10 is not drawing current, or fairly small, as occurs when the lamps 10 are drawing current, and there is no fault in the circuit, the transistor 82 will remain off. However, if one (or more) of the resistors 16 should become high-resistance or open-circuit, a much larger voltage will appear between its ends when the switch 12 is closed, and this voltage will turn on the transistor 82. The diodes 84 ensure that the transistor 82 is not still held off by the shunting effect of the good resistor 16.

A further transistor 82' is connected in a similar manner across the fuse 86 supplying the lighting circuits; in contrast to the circuits of FIGS. 2 to 7, the fuse 86 in FIG. 8 is connected between the switch 12 and the battery 14. Only one fuse 86 is shown, but it will be understood that there could be more. A diode 84' is included in series with the base of the transistor 82'; if a single transistor is used to monitor more than one fuse, the diode 84' is duplicated, and performs the same function as the diodes 84. The presence of the diode 84' also means that the voltage across the fuse must reach about 1.4 volts before the transistor 82' will turn on, instead of the 0.7 volts required before the transistors 150 of FIG. 2 will turn on The collector of each of the transistors 82 and 82' leads, through its own diode 88, to a common point 90, which corresponds exactly to the common point 90 of FIG. 2. The remainder of the circuit will not be described in detail, since it is identical to the corresponding parts of FIG. 2, with the exception that the connection between the collectors of the transistor 58" and the input of the amplifier 60 is formed by an external connection between a terminal of the integrated circuit 81 and the terminal T3 of the integrated circuit 24.

In order to comply with some of the standards laid down for the electrical systems for motor vehicles, the resistors 16 may have to be constructed to withstand a considerable overload; for example, 20 times normal current for one minute. This may result in the resistors being appreciably more expensive than if they were not required to carry anything more than their normal load current. One way of reducing this expense is to combine the function of the resistor with that of the fuse; the ordinary fuses, such as that shown at 86 in FIG. 2, can then be eliminated, and the resistors 16 will be designed to fail at, for example, twice their normal load current, and thereby protect the rest of the circuit. In this case, of course, the resistors 16 would be mounted in some readily removable manner, exactly as a fuse would be, such as by spring clips, or even by wrapped connectors.

In the arrangements described above, each lighting control switch controls two or more lamps, and each lamp is provided with its own series resistor 16. An alternative approach is to provide a single resistor in series with a parallel group of lamps; this reduces the number of resistors required, and also reduces the number of connections which have to be made between the main lighting circuits and the monitoring circuits. However, it also means that, instead of there being only two possible conditions (lamp failure or no lamp failure) which can occur in the circuits fed by a single sensing resistor 16, there are, in the case of a parallel group of two lamps, three possible conditions (no lamp failure, one failed lamp and two failed lamps). A warning signal must be given in either of the latter two conditions, and since there is still a potential drop across the series resistor in the case where only one lamp has failed, it follows that the monitoring circuit must give a warning signal when the potential difference across the resistor has fallen below a reference value which always lies between the potential drop to be expected when both lamps are working and the potential drop to be expected when only one lamp is working. In other words, the monitoring circuit can be regarded as receiving both 'forward' and 'reverse' bias voltages, the forward bias voltage being that which tends, in the absence of a balancing reverse bias voltage, to produce an alarm signal. The reverse bias voltage would thus be the potential difference across the sensing resistor, while the forward bias voltage would be the reference value. If the resistance of the lamps remained constant, the expected values of reverse bias would be directly proportional to the battery voltage, and the forward bias (the reference value) could therefore easily be derived from a straightforward resistive potential divider. However, since a tungsten filament lamp has an appreciable positive temperature coefficient of resistance, the resistance of the lamps, when operating, will increase considerably with an increase in the battery voltage. This means that the expected values of potential drop will not be directly proportional to battery voltage; if the reference value is still derived from a resistive potential divider, there may be difficulties in ensuring that the reference value always remains between the two expected values of potential difference which have to be distinguished, especially if the parallel group contains more than two lamps. The position is aggravated by the tolerances allowed in the manufacture of the lamps.

Figure 9:
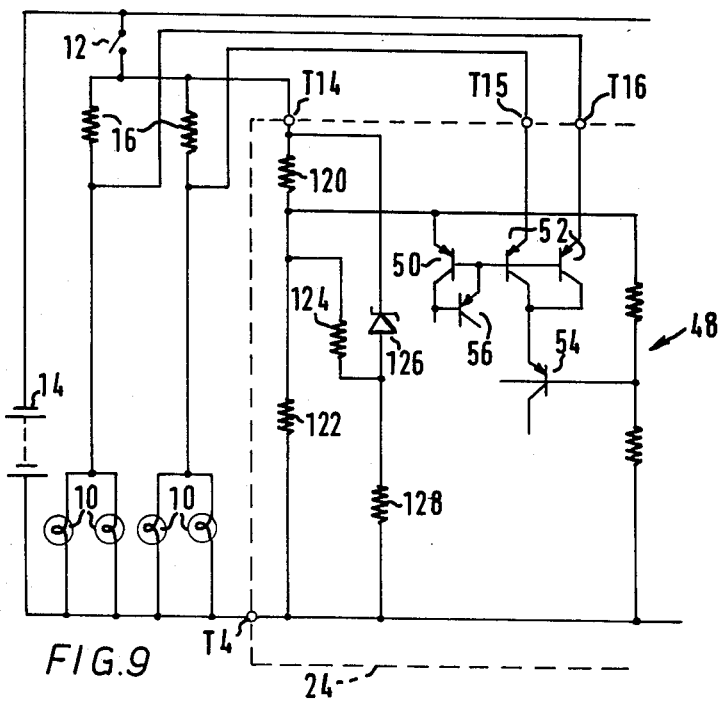
FIG. 9 is a circuit diagram, similar to part of FIG. 1, showing an arrangement for monitoring parallel groups of lamps.

The circuit shown in FIG. 9 is intended to overcome these difficulties, by providing a reference voltage which varies in a similar manner with variations in battery voltage as does the potential drop across the series sensing resistors 16. FIG. 9 corresponds to a part of FIG. 1, and similar reference numbers will be used for corresponding parts. As in FIG. 1, the switch 12 supplies two resistors 16, but now each resistor feeds a parallel group of two lamps 10.

As mentioned above, the potential drop across the resistors 16 is not directly proportional to battery voltage; instead, where $V_1$ is the potential drop and $V_B$ is the battery voltage, the relation between $V_1$ and $V_B$ over the normal range of battery voltage (about 8 V to 16 V for a nominally 12 V system) can be approximated by a proportionality of the form $$V_1 \alpha V_B^\alpha$$

where the exponent $\alpha$ is less than 1. In many cases, it is found that the value of $\alpha$ is very close to 0.5.

The circuit of FIG. 9 provides a forward bias voltage whose variation with battery voltage is a straight-line approximation to the proportionality given above. It can be shown that, where $V_{BNOM}$ is the nominal battery voltage, and $V_{1NOM}$ is the value of $V_1$ at the nominal battery voltage, the straight line which approximates to the proportionality at nominal battery voltage is given by $$V_1 \alpha (1 - \alpha) V_{1NOM} + \alpha \cdot \frac{V_{1NOM}}{V_{BNOM}} \cdot V_b$$

The reference voltage is developed across a low value resistor 120, which has one end connected through the switch 12 to the battery positive terminal, and has flowing through it two components of current, corresponding to the two terms in the immediately foregoing proportionality. The current corresponding to the second term is furnished by a resistor 122, which is connected to the battery negative terminal, to provide a current directly proportional to battery voltage, while the current corresponding to the first term is furnished by a resistor 124, which is connected to a source of constant voltage (relative to the battery positive terminal) comprising a zener diode 126 biased by a resistor 128.

The reference voltage is compared with the actual potential drops across the resistors 16 by the transistors 50 and 52; instead of the emitter of the transistor 50 being connected directly to the junction between the switch 12 and the resistors 16, as in FIG. 1, it is connected to the reference voltage provided at the junction of the resistors 120, 122 and 124. This means that the voltage unbalancing the transistors 50 and 52 from exactly mirroring the current supplied by the transistor 46 will now be the difference between the potential drop across the relevant resistor 16 and that across the resistor 120. The values of the various components of the circuit are so selected that, with both lamps 10 of a parallel pair working, the unbalance voltage is of such a sense and magnitude as to keep the current in the associated transistor 52 small enough not to turn on the transistor 58, for all expected values of battery voltage and for all expected manufacturing variations in the lamps 10. Because, with the circuit of FIG. 9, variations in battery voltage have similar effects on both the potential differences across the resistors 16 and 120, the unbalance voltage need not at any point over the expected range of battery voltage become much greater than the minimum value necessary to ensure that the transitor 58 remains off.

Conversely, with only one lamp of a parallel pair working, the out-of-balance voltage applied to the transistors 50 and 52 will be of the opposite sense, and of such a magnitude as to ensure that the transistor 58 remains on for all expected operating conditions. Again, since variations in battery voltage have similar effects on the potential differences across the resistors 16 and 120, the unbalance voltage need not, for any expected battery voltage, become much greater than the minimum value necessary to ensure that the transistor 58 remains on.

It follows that the difference needed between the voltage drops across the resistor 16 when two lamps are working and when only one lamp is working can be kept to a smaller value than if the unbalance voltage varied considerably with variations in battery voltage, as would occur if the reference voltage were derived from a simple resistive potential divider connected across the battery 14. It follows in turn that the resistor 16 can have a lower resistance than would otherwise be possible, and this may be advantageous in ensuring that the fuses can protect the circuits against short-circuits, and in keeping the loss of voltage supplied to the lamps 10 to a minimum.

What is claimed is:

1. A monitoring circuit for monitoring the voltage across a sensing resistor in series with a load, comprising a power supply line, means arranged to furnish two reference currents, which currents are each dependent both on temperature and on the voltage on the power supply line, a temperature-dependent voltage-stabilizing circuit for supplying the power supply line, said voltage-stabilizing circuit having a temperature co-efficient of such a sense and magnitude that the changes in a reference current due directly to changes in temperature are substantially offset by the changes in that reference current due to changes in the voltage on its power supply line, which changes are in turn due to the same changes in temperature; current-repeating means arranged to receive one of the said reference currents, and to provide an output current which is dependent both on the said one reference current, and on the potential difference across the series sensing resistor, the value of the output current at a predetermined value of the said potential difference being directly related to the value of the said one reference current; and comparing means connected for comparing the output current with the other reference current and to provide an output signal indicating whether the said potential difference is above or below the said predetermined value, in accordance with the result of the comparison.

2. A monitoring circuit according to claim 1, wherein the reference current circuit includes a resistor in series with two silicon p-n junctions and the voltage-stabilizing circuit has a negative temperature coefficient of voltage of the same value as that of a said p-n junction, whereby the reference current will remain substantially constant despite temperature variations.

3. A monitoring circuit according to claim 1, further including a latch circuit, a single enabling/disabling terminal for said latch circuit so that by making differing connections, or no connection at all, to the enabling-/disabling terminal, the latch circuit exhibits either first and second stable states respectively corresponding to voltages greater and smaller than a threshold value across the series sensing resistor, or exhibits only the first stable state, said latch circuit being connected to receive signals from a voltage-monitoring part of the circuit, which signals tend to switch the latch from its first stable state to its second stable state if the monitored voltage should fall below the the threshold value, and warning means arranged to provide a warning signal if either the latch circuit adopts its second stable state, or when the latch is disabled to have only the first stable state, the signals from the voltage-monitoring part of the circuit indicate that the monitored voltage has fallen below the threshold value.

4. A monitoring circuit according to claim 3, wherein the output of the latch circuit is permanently connected to a control input of the warning means, whether or not the latch is enabled.

5. A monitoring circuit according to claim 4, wherein the latch circuit remains firmly in its first state when disabled, whatever the value of the monitored voltage, and a bypass signal path is provided from the voltage-monitoring part of the circuit to a control input of the warning means, whereby when the latch circuit is disabled, the warning means is influenced only by the signals in the bypass path.

6. A monitoring circuit according to claim 4, wherein the latch circuit is so arranged that, when disabled and the monitored voltage falls below the threshold value, the latch circuit adopts its second state which, however, is arranged to be an unstable state, whereafter the latch circuit reverts to its first state, and the warning signal would cease, as soon as the monitored voltage rises above the threshold value again, and there is no need for a bypass signal path.

7. A monitoring circuit according to claim 1, wherein the load is an incandescent lamp load, and further including a source of a reference voltage which is supplied from the same supply as the load and furnishes a reference voltage the variation of which with changes in supply voltage is similar to the variation in the monitored voltage with changes in supply voltage, and said comparing means is arranged to compare the monitored voltage with the reference voltage and to provide a warning signal if the monitored voltage should become less than the reference voltage.

8. A monitoring circuit according to claim 7 wherein said reference voltage source is arranged to provide a voltage which is the sum of a first, constant component and a second component which is proportional to supply voltage, and is given by a proportionality of the form:

$$V_1 \alpha (1 - \alpha) V_{1NOM} + \alpha \cdot \frac{V_{1NOM}}{V_{BNOM}} \cdot V_b$$

where $V_1$ and $V_B$ are the reference and supply voltages, respectively, $V_{BNOM}$ is the nominal supply voltage, and $V_{1NOM}$ is the reference voltage needed at the nominal supply voltage, and the exponent $\alpha$ is approximately 0.5.

9. A monitoring circuit according to claim 1, including first means responsive to the voltage across the sensing resistor and arranged to provide a warning signal if the voltage should fall below a predetermined small value, and second means responsive to the voltage across the sensing resistor or a fuse in series with the load, and arranged to provide a warning signal if the latter voltage should rise above a predetermined value greater than the said predetermined small value.

10. A monitoring circuit according to claim 9, wherein the voltage above which the voltage across the series resistor or fuse must rise in order to generate a warning signal is set by the forward voltage drop of at least one p-n junction.

11. A monitoring circuit according to claim 10 wherein the base-emitter junction of a silicon transistor is connected across the series resistor so that the transistor turns ON as soon as the voltage across the resistor exceeds about 0.7 volts.

12. A monitoring circuit according to claim 10 wherein, where several loads, each with its own sensing resistor, are fed from a common point, all the resistors are monitored using a single multiple-emitter transistor the base of which is connected to the common point, while each emitter of the transistor is connected to the other end of a respective one of the resistors.

13. A monitoring circuit according to claim 10, wherein a single-emitter transistor is used as the p-n junction, a separate diode being connected between its input electrode and each of the said other ends of the resistors so that the diodes form an OR-gate.

14. A monitoring circuit according to claim 12, wherein a fuse serving to protect the circuit is inserted between the common feed point for the resistors and the resistors themselves, whereby the fuse is automatically monitored along with the resistors.

15. A monitoring circuit according to claim 12, wherein where more than one fuse is used to protect the circuit, the plurality of fuses is arranged to be fed from a common point, and a single transistor is connected to monitor all the fuses.

16. A monitoring circuit according to claim 1, wherein only one warning device is used, and is activated in response to any of the types of failure which can be detected by the monitoring circuit.

17. A monitoring circuit according to claim 16, wherein the warning device is a lamp activated by steady illumination or by flashing to indicate different types of failure.

18. A monitoring circuit according to claim 16, wherein separate warning devices are provided to indicate the different types of failure.

* * * * *